United States Patent [19]
Richardson

[11] 3,942,477
[45] Mar. 9, 1976

[54] SANDBOX HORSE TRAINING APPARATUS

[75] Inventor: William R. Richardson, Phoenix, Ariz.

[73] Assignee: Valley National Bank, Phoenix, Ariz.

[22] Filed: Apr. 9, 1973

[21] Appl. No.: 350,133

[52] U.S. Cl. ............................. 119/29; 119/27
[51] Int. Cl.² ........................................ H01K 15/00
[58] Field of Search ......... 119/29, 20, 96, 51 R, 15, 119/27

[56] References Cited
UNITED STATES PATENTS
3,077,860   2/1963   Moores ........................... 119/29 X
3,148,663   9/1964   Conover ......................... 119/20 X Primary Examiner—Louis G. Mancene
Assistant Examiner—J. N. Eskovitz
Attorney, Agent, or Firm—Clarence A. O'Brien; Harvey B. Jacobson

[57] ABSTRACT

A horse is trained by being placed in a stall and covered completely with a loose granular material such as sand. Visual and sound images may be transmitted to the animal while the stall is being filled with the animal covering material. Side walls of the stall are formed by double panels, the innermost of which move relative to a floor of the stall to permit sand to pass into the stall. A pair of perforated plates form the stall floor, one of the plates being arranged for movement to align and misalign the perforations in the plates and retain sand in or pass it from the stall.

8 Claims, 2 Drawing Figures

SANDBOX HORSE TRAINING APPARATUS

BACKGROUND OF THE INVENTION

1. Field of the Invention

This invention relates to a method and apparatus for training animals such as horses, and the like.

2. Description of the Prior Art

In the 1850's and 1860's an American named John Solomon Rarey achieved international acclaim for his methods of taming and training horses. These methods were generally based on three fundamental principles, known as the Rarey Theory, which may be stated as follows:

1. The horse is so constituted by nature that he will not offer resistance to any demand made of him which he fully comprehends, if made in a way consistent with the laws of his nature.
2. That he has no consciousness of his strength beyond his experience, and can be handled according to our will without force.
3. That we can, in compliance with the laws of his nature, by which he examines all things new to him, take any object, however frightful, around, or on him, that does not inflict pain, without causing him to fear.

These methods, however, are basically very time consuming, and require patience and a lot of time of the trainer.

SUMMARY OF THE INVENTION

It is an object of the present invention to provide a method and apparatus for training animals, such as horses, in accordance with the Rarey Theory.

It is another object of the present invention to provide a method and apparatus for training a horse, and the like, in substantially less time than required by conventional methods.

It is yet another object of the present invention to provide a method and apparatus for restraining a horse, and the like, in a painless, unfrightening manner.

It is still another object of the present invention to provide a method and apparatus for exposing a restrained horse, and the like, to conditions the animal will encounter at some subsequent time and place.

These and other objects are achieved according to the present invention by producing an animal restraining apparatus having: an enclosure arranged for confining an untrained animal; and apparatus for filling the enclosure with a loose granular material, such as sand, and covering the untrained animal.

This enclosure may be filled by forming a wall of same by a pair of spaced panels, and arranging the innermost of the panels for movement away from a bottom surface of the enclosure and permitting a loose granular material to flow under the innermost panel and into the enclosure.

The enclosure is advantageously a stall, and both side walls of the stall spaced panels arranged for passing sand, and the like, into the stall.

A preferred embodiment of the present invention forms the enclosure as three stalls arranged side-by-side, with the untrained animal confined in the middle stall of the three and gentle animals, such as mares, are arranged in the end stalls. Advantageously, the stalls are arranged for permitting the untrained animal to see and touch the gentle animals.

According to a preferred feature of the present invention, the enclosure has a bottom surface including a pair of parallel plates provided with perforations, and a fluid motor, and the like, connected to one of the plates for moving same between a position misaligning the perforations of the one plate with the perforations of the other of the plates and retaining the granular material in the enclosure, and a position aligning the perforations of the plates and permitting the granular material to flow out of the enclosure under the influence of gravity.

Another advantageous feature of the present invention provides apparatus associated with the enclosure for transmitting visual and sound images to an untrained animal being covered with granular material.

A method for training horses according to the present invention has the steps of: placing an untrained animal in an enclosure; and covering completely the animal with a loose granular material.

The step of placing the animal in an enclosure includes the steps of: leading gentle animals, such as mares, into stalls flanking an untrained animal stall; and permitting the untrained animal to go into the untrained animal stall of the untrained animal's own accord. Further, the covering step includes the steps of: filling the stall with sand from a bottom of the stall up; showing a picture to the untrained animal simultaneously with the filling step; and broadcasting sounds to the untrained animal simultaneously with the filling and picture showing steps.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figures 1, 2:
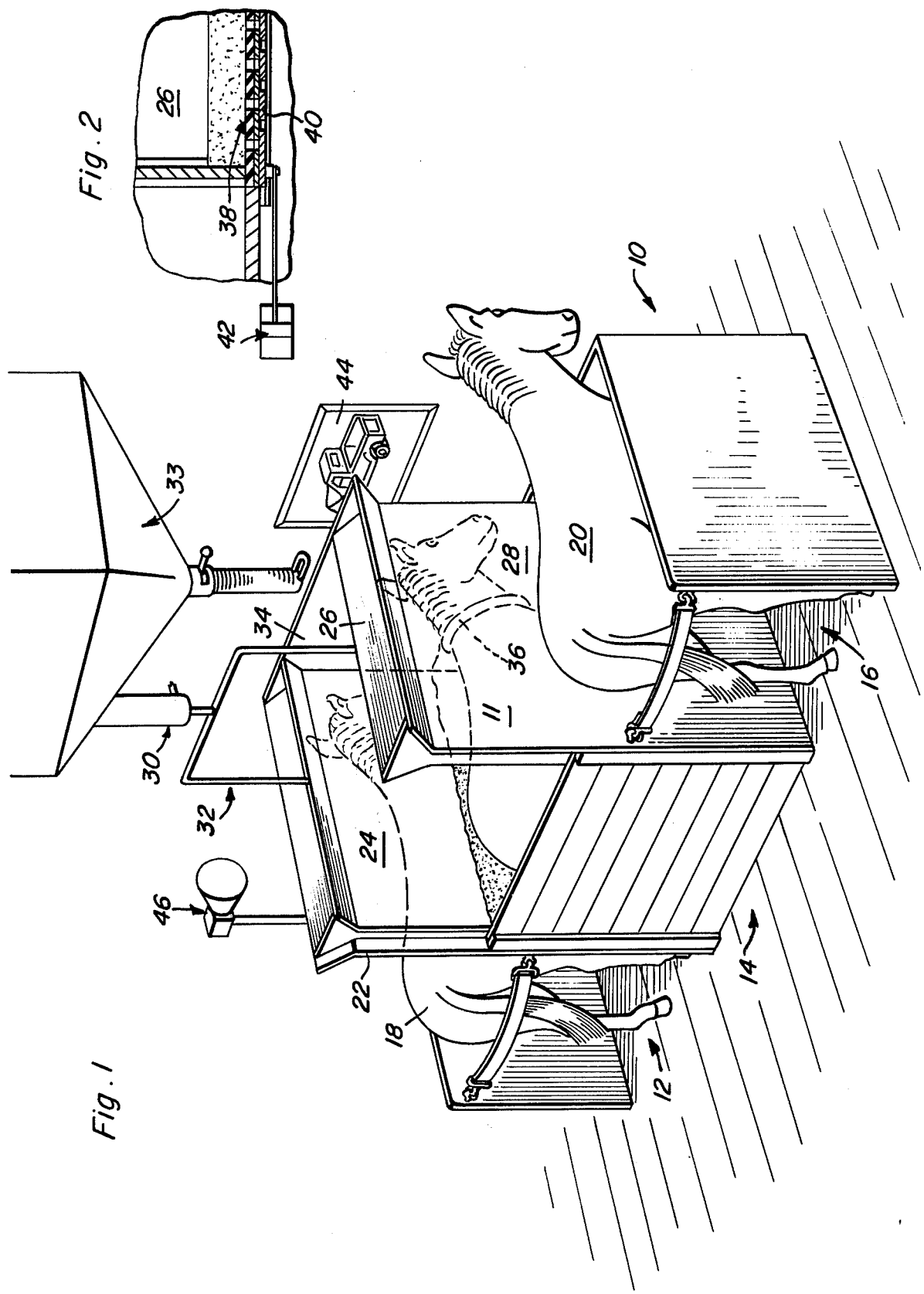
FIG. 1 is a fragmentary, perspective view showing an animal training apparatus according to the present invention.
FIG. 2 is a fragmentary, vertical sectional view showing a detail of animal training apparatus according to the present invention.

Referring now more particularly to FIG. 1 of the drawings, horse training apparatus according to the present invention has an enclosure 10 arranged for confining an untrained animal 11. This enclosure 10 is advantageously formed as three stalls, 12, 14, and 16 arranged side-by-side, with untrained animal 11 confined in the middle stall 14 of the three and gentle mares 18 and 20 arranged in the end stalls 14 and 18. Apparatus to be set out in detail below is provided for filling stall 16 with a loose granular material, such as sand, and covering completely untrained animal 11.

Stall 14 may be filled with sand, and the like, by using pairs of spaced panels 22, 24 and 26, 28 to form its side walls. A spacing of, for example, eight inches has been found satisfactory for these panels. A suitable, known motor 30, which may be either a conventional fluid or electric linear motor, is connected to the innermost panels 24 and 26 as by a bracket 32 for moving these panels away from the bottom surface of stall 14 and permitting a loose granular material such as sand to flow under the same innermost panels 24 and 26 and into stall 14. The use of bracket 32 assures uniform, simultaneous movement of both innermost panels 24 and 26. All of the panels are provided with diverging top portions so that the associated side walls flareout at their top from, for example, eight inches to thirty inches. These side walls formed by panels 22, 24 and 26, 28 are filled with sand prior to an animal restraining operation as by means of a hopper 33 mounted over stall 14 in any suitable, known manner (not shown).

A headpiece 34 formed from a sheet of canvas, and the like, is arranged covering the end of stall 14 at which the head of animal 11 is arranged, and is provided with an opening 36 forming a collar for the animal which prohibits the granular material from seeping out of stall 14. By constructing stalls 12, 14, and 16 in the manner illustrated, all three of the horses have their heads extending out of their associated stalls so they can see one another and the untrained animal 11 cannot only see mares 18 and 20, but can touch them with his nose as well. Sheet 34 effectively forms a horse stanchion, and permits even untrained animal 11 to have his head free from the shoulders out.

Stall 14 has a bottom surface formed by a pair of parallel plates 38 and 40 provided with perforations which may be aligned and misaligned by movement of plate 40. Plate 38 is advantageously provided with a conventional rubber coating to provide good footing for animal 11. Plates 38 and 40, including the rubber coating and perforations, are shown in FIG. 2 of the drawings. A suitable, known linear motor 42, which also may be either a conventional fluid or electric linear motor, is connected to plate 40 for reciprocably moving same in a plane parallel to plate 38. In this manner, plate 40 may be moved between a position misaligning the perforations of plates 38 and 40 and retaining the granular material in stall 14, and a position aligning these perforations and permitting the granular material to flow out of stall 14 under the influence of gravity. This arrangement permits animal 11 to be easily uncovered once the training operation is completed, and permits reuse of the granular material by providing an elevating conveyor (not shown) beneath the floor of stall 14 to lift the granular material to hopper 33 for recycling.

Conventional apparatus, such as a sound-track motion-picture projector, a slide projector, a still picture mounting arrangement, a sound propagating device, and the like, are provided adjacent the stalls 12, 14, and 16 for transmitting a visual image 44 and a sound image as from a speaker 46 to animal 11. These images permit the animal to be conditioned to sights and sounds which the animal will encounter and experience subsequent to the training treatment.

Before placing animal 11 in stall 14, it is advantageous to place animal 11 in a pen with mares 18 and 20 for one night. These mares 18 and 20 should be very docile, gentle mares, and may be provided with bells on their necks so that the young horse, and the like, to be trained will more easily follow their movements. The next morning, mares 18 and 20 are led into stalls 12 and 16. Animal 11 will follow and go into stall 14 on his own accord a few minutes after mares 18 and 20 are in the end stalls. The sand, and the like, passes under panels 24 and 26 as they are raised vertically, and completely covers animal 11 from the animal's feet on up. In this manner, it is possible to restrain, without a rope, an unbroken horse, and the like, without violating the laws of the animal's nature. It is possible using the method and apparatus according to the present invention to conquer an unbroken animal in a manner of minutes. Further, by showing him a picture together with sound, the animal is prepared for subsequent experiences. A horse may be completely subdued and ready for further training without any violence or struggle.

Use of the method and apparatus according to the present invention may save three to four months hard work by a trainer. Although the present method and apparatus is quick and efficient, it is also very humane. A horse tamed and trained by treatment according to the present invention becomes so accustomed to being restrained as by being completely covered with sand, and the like, that the animal may be surrounded by an air bag, and the like, while being shipped. The method and apparatus according to the present invention is particularly beneficial to prepare horses for shipment by air. It is to be understood that although horses have been used in the illustrated examples, the method and apparatus of the present invention could be used for shipping wild animals, cattle, and other similar animals.

A process according to the present invention may tame an unbroken horse in, for example, thirty minutes, with ten minutes required to recycle the sand for another treatment. All this is accomplished in such a short time without hurting or frightening the animal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for training horses, comprising, in combination:
   a. an enclosure arranged for confining an untrained animal; and
   b. means for filling the enclosure with a loose granular material and covering the untrained animal, the filling means including a pair of spaced panels forming a wall of the enclosure, and means for moving the innermost of the panels away from a bottom surface of the enclosure and permitting a loose granular material to flow under the innermost panel and into the enclosure.

2. A structure as defined in claim 1, wherein the enclosure is a stall, and there are two pairs of spaced panels arranged forming side walls of the stall, and the moving means moves each innermost wall of the two pairs.

3. A structure as defined in claim 2, wherein the enclosure is three stalls arranged side-by-side, with the untrained animal confined in the middle stall of the three and gentle animals arranged in the end stalls, a headpiece for the untrained animal arranged for preventing granular material from seeping out of the middle stall, and the stalls are arranged for permitting the untrained animal to see and touch the gentle animals.

4. A structure as defined in claim 3, wherein the stall has a bottom surface including a pair of parallel plates provided with perforations, and means connected to one of the plates for moving same between a position misaligning the perforations of the one plate with the perforations of the other of the plates and retaining the granular material in the stall, and a position aligning the perforations of the plates and permitting the granular material to flow out of the stall under the influence of gravity.

5. A structure as defined in claim 4, wherein means are associated with the enclosure for transmitting visual and sound images to an untrained animal being covered with granular material.

6. A structure as defined in claim 1, wherein the enclosure is three stalls arranged side-by-side, with the untrained animal confined in the middle stall of the three and gentle animals arranged in the end stalls, a headpiece for the untrained animal arranged for preventing granular material from seeping out of the middle stall, and the stalls are arranged for permitting the untrained animal to see and touch the gentle animals.

7. A structure as defined in claim 1, wherein means are associated with the enclosure for transmitting visual and sound images to an untrained animal while the animal is being covered with the granular material for preparing the animal for subsequent experiences.

8. Apparatus for training horses, comprising, in combination:

a. an enclosure arranged for confining an untrained animal, the enclosure having a bottom surface including a pair of parallel plates provided with perforations, and means connected to one of the plates for moving same between a position misaligning the perforations of the one plate with the perforations of the other of the plates and retaining a loose granular material in the enclosure, and a position aligning the perforations of the plates and permitting the granular material to flow out of the enclosure under the influence of gravity; and b. means for filling the enclosure with the loose granular material and covering the untrained animal.

* * * * *

UNITED STATES PATENT OFFICE
CERTIFICATE OF CORRECTION

PATENT NO. : 3,942,477
DATED : March 9, 1976
INVENTOR(S) : William R. Richardson It is certified that error appears in the above-identified patent and that said Letters Patent are hereby corrected as shown below:

In the heading, after "Appl. No.: 350,133" insert--

--The portion of the term of this patent subsequent to July 9, 1992, has been disclaimed.--

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*